United States Patent [19]

Schlagmuller et al.

[11] 4,046,240
[45] Sept. 6, 1977

[54] CENTRIFUGAL FRICTION CLUTCH

[75] Inventors: Walter Schlagmuller, Schwieberdingen; Rudolf Babitzka, Kirchberg, Murr, both of Germany

[73] Assignee: Robert Bosch G.m.b.H., Stuttgart, Germany

[21] Appl. No.: 671,829

[22] Filed: Mar. 30, 1976

[30] Foreign Application Priority Data

June 27, 1975 Germany .............................. 2528719

[51] Int. Cl.² ........................................... F16D 43/14
[52] U.S. Cl. ................................. 192/104 C; 192/79
[58] Field of Search .......... 192/104 B, 104 C, 103 B, 192/105 CD, 105 CE

[56] References Cited

U.S. PATENT DOCUMENTS

| 2,225,072 | 12/1940 | Meyerhoefer | 192/104 C |
| 3,769,905 | 11/1973 | Dishcler | 11/105 CD |

FOREIGN PATENT DOCUMENTS

| 512,653 | 2/1955 | Italy | 192/105 CD |
| 268,379 | 7/1927 | United Kingdom | 192/104 B |
| 391,548 | 7/1932 | United Kingdom | 192/104 C |
| 1,224,105 | 3/1971 | United Kingdom | 192/105 CD |

Primary Examiner—Benjamin W. Wyche
Attorney, Agent, or Firm—Flynn & Frishauf

[57] ABSTRACT

A double-arm, sharply angled lever is pivoted at its fulcrum to the drive element of the clutch, and has one arm extending generally in a direction to the center of rotation of the driven element, and biassed by a spring force to engage the driven element. The fulcrum or pivot point of the double-arm lever is so placed with respect to the engagement surface of the arm of the lever with respect to the driven element, that the resulting force vector, resulting from the perpendicularly acting engagement force of the arm of the lever, in essentially radial direction, and the frictional force between the circumference of the driven element and the arm of the lever are located slightly behind the pivot point of the lever when the clutch is engaged, to effect self-locking of the lever arm against the driven element. The second arm of the lever carries, or is formed with a centrifugal weight and, upon rapid rotation of the driven element, moves the lever to swing outwardly, against the force of a spring, self-locking being overcome when the resultant force vector passes through and then in advance of the pivot point of the lever, providing for smooth engagement and disengagement of the clutch with positive, self-locking when the clutch is engaged. The position of the pivot or fulcrum point of the lever with respect to the resulting engagement force provides a toggle action, with binding force on one side of the toggle, and smooth, release/engagement at the other.

6 Claims, 5 Drawing Figures

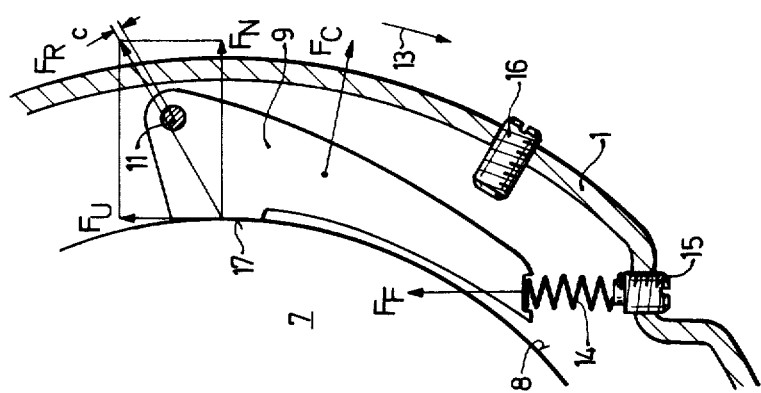
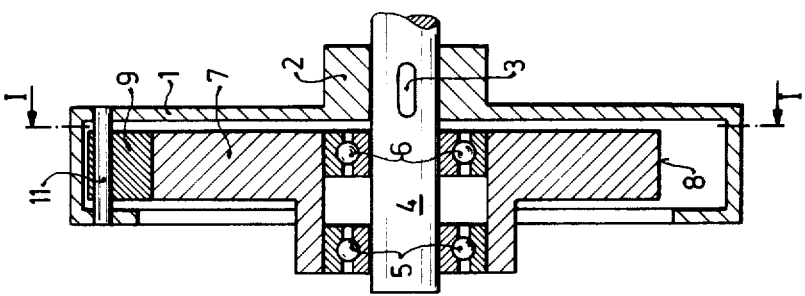
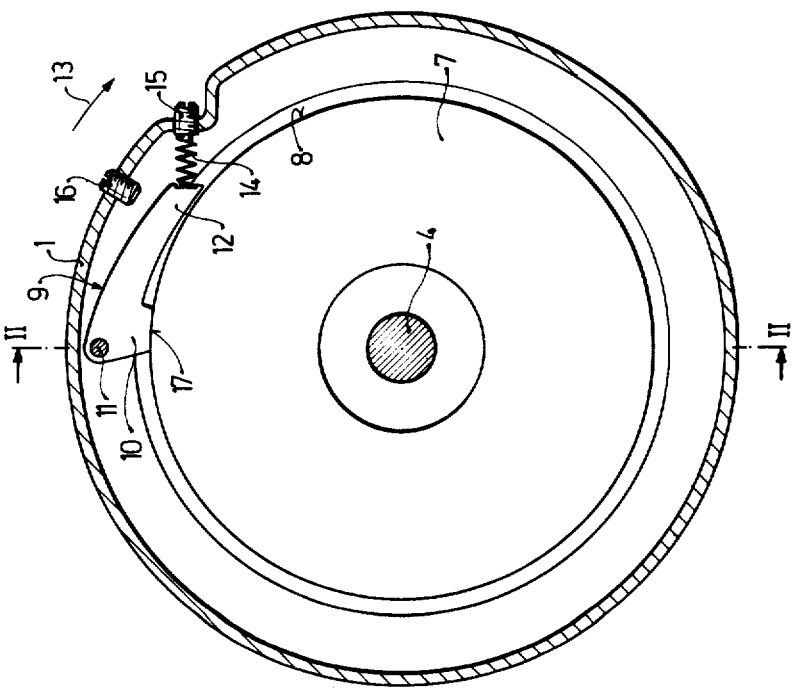

4,046,240

CENTRIFUGAL FRICTION CLUTCH

The present invention relates to a centrifugal clutch in which a centrifugal body is provided formed as a lever, and more particularly to such a clutch which is engaged upon low speeds of rotation and disengaged at high speeds of rotation.

Various centrifugal clutches have been proposed; the difficulty with most of these clutches is that a transition range between completely uncoupled and completely coupled mode of operation of the clutch is difficult to control since, during this transition range, the clutch will constantly slip. During the slipping conditions of the clutch, the engaging surfaces are subject to wear and heating. Prolonged wear and heating, that is, prolonged transition states between engaged and disengaged operating mode cause rapid breakdown. To prevent malfunction, it has been customary to over-dimension the clutch part or to so arrange the weights and speed relationships that the transition speed range is rapidly passed.

It is an object of the present invention to provide a centrifugal clutch which operates with a minimum of transition between disengaged and engaged range, and which still permits positive coupling of a load to a drive element without jolts or shocks, that is, which does permit some engagement slippage, but very little. Additionally, the clutch should be simple to construct and be practically maintenance-free.

SUBJECT MATTER OF THE PRESENT INVENTION

Briefly, the engagement forces between the drive and driven elements of the clutch are so arranged that, in engaged condition, a self-locking or self-binding effect is obtained by moving the engagement element in toggle-manner beyond a toggle pivot or fulcrum, or over-center position. When the transition speed is reached, the engagement element moves through the center position — counter the force of a spring — to then rapdily disengage. Upon re-engagement, for example upon decrease of speed of the drive element, frictional engagement between the drive element and the driven element will carry the engagement element through the over-center or toggle position to effect locking engagement between the two elements.

In accordance with a feature of the invention, the engagement element is a double-arm lever, secured to the drive element and pivotable about a pivot axis parallel to the shaft of the clutch; the double-arm lever has one engagement arm which points generally to the center of the clutch, to engage the circumference of the driven element, the pivot point for the double-arm lever being so located that the resultant force vector, resulting from the radially directed engagement force due to the spring, and the circumferential or frictional force upon engagement, is located behind the pivot axis or pivot point of the double-arm lever, preferably by a small distance, to effect self-locking when the clutch is engaged and, upon movement of the lever under centrifugal force and counter the force of the spring, the resulting force vector will shift through the center point of the pivot and then rapidly effect disengagement of the clutch.

The invention will be described by way of example with reference to the accompanying drawings, wherein:

FIG. 1 is a schematic end view of the clutch, omitting all parts not necessary for an understanding of the present invention, partly in section;

FIG. 2 is a longitudinal sectional view along line II—II of FIG. 1;

FIG. 3 is a fragmentary view of the clutch portion similar to FIG. 1, to a greatly enlarged scale, and showing force relationships;

Figure 5:
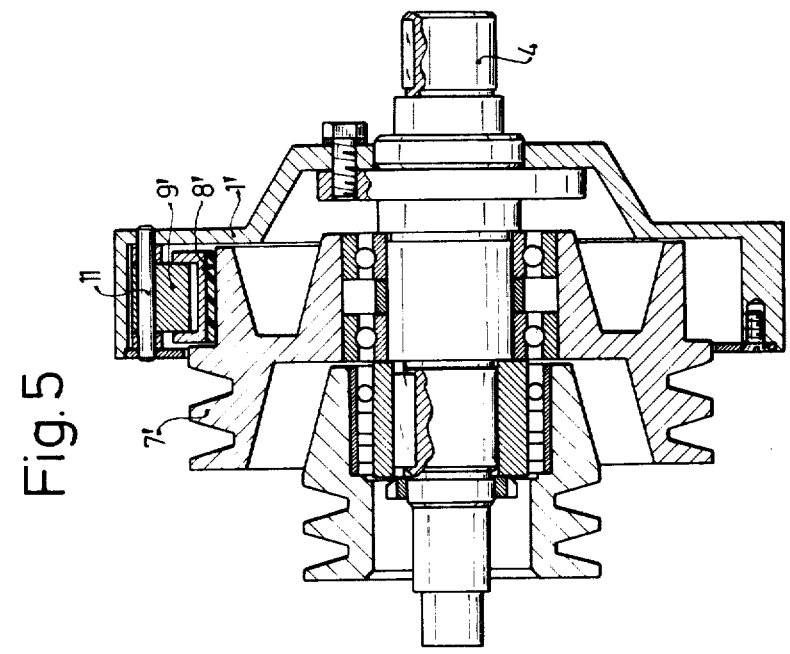
FIG. 5 is an axial cross section through the embodiment of FIG. 4, in which the section line of FIG. 5 is angled with its center at the axis of the shaft of the clutch.

The clutch (FIGS. 1, 2) has a driven element formed as a housing 1 to which a hub 2 is attached, or formed integrally therewith. Hub 2 is secured to a shaft 4 for rotary torque transmission, for example by a spline or key 3. Shaft 4 is connected to a rotary drive source, not shown, for example an internal combustion enging of a motor vehicle. A driven clutch disk 7 is journalled on shaft 4 by two ball bearings 5, 6. The circumference 8 of clutch disk 7 is engaged by the engagement arm 10 of a double-arm coupling lever 9. Coupling lever 9 is pivoted on a pivot pin 11 secured to the drive element 1 of the clutch. The lever 9 is sharply angled; the second lever arm extending from pin 11 projects forwardly — with respect to the direction of rotation of the drive element, as indicated by arrow 13. The direction of projection is approximately tangential with respect to rotation of the clutch. The free end 12 of lever 9 is engaged by a compression spring 14. The spring force of spring 14 can be adjusted by a set screw 15 extending through, and threaded into the housing 1 of the drive element of the clutch. A second set screw 16 is threaded into the housing 1; set screw 16 forms a stop for the coupling lever 9 if, at high speeds, the coupling lever pivots outwardly.

The clutch is so arranged that it is engaged under low-speed conditions and disengaged under high-speed conditions.

Operation, with reference to FIG. 3: FIG. 3 illustrates the force conditions when the clutch is engaged, that is, when the drive element 1 is drive by a motor at a speed below that of the disengagement speed. The engagement arm 10 of coupling lever 9 has its entire engagement surface 17 pressed against the circumference 8 of the driven clutch element 7. The resulting forces will be as follows: The spring force $F_F$ provides a bias force for the arm 10 which results in an essentially radially directed engagement force $F_N$; the frictional force between the engagement surface 17 of arm 10 and the circumferential surface 8 of driven element 7 is a circumferential frictional force $F_U$. The engagement surface 17 of the arm 10 of lever 9, and the axis of the pivot pin 11 are respectively so arranged that the resulting force of the normal or radial force $F_N$ and the circumferential friction force $F_U$, shown as the vector $F_R$, is located behind the axis of pivot pin 11 by a small distance $c$, in which the term "behind" is taken with respect to the direction of rotation of the drive element 1, as indicated by arrow 13. The position of the resulting force $F_R$ in advance of the axis of rotation of pivot pin 11 causes a moment $F_R \cdot c$, tending to swing the arm in a direction to more strongly engage the surfaces 17 and 8, and thus lead to self-locking of the lever arm 10 against the circumference 8 of the driven element 7.

Direction of the moment can clearly be seen in FIG. 3, tending to swing the lever 9 to rotate in clockwise direction.

As the speed of shaft 4 increases, the centrifugal force $F_C$ will increase and eventually be so great that the movement $F_C$ times the distance of the force vector $F_C$ from pivot point 11 will exceed the moment due to the spring force $F_F$, as transferred to form the normal force $F_N$, the frictional circumferential engagement force $F_U$ and the distance $c$. The necessary normal force $F_N$ then will no longer be sufficient to transfer the torque $M_d$ at the engagement surfaces 8, 17, and the clutch will begin to slip. As soon as the clutch slips, the frictional force at the engagement surface will change from $\mu_H$, that is from a holding friction force to $\mu_S$, that is to a slipping frictional force. The resulting force vector $F_R$ will change not only in magnitude but also in effective direction, resulting in a moment which is counter-clockwise, and resulting in immediate disengagement of the clutch. Thus, disengagement is rapid and lever 9 will quickly change position so that the resulting engagement force will quickly shift through the center of pivot pin 11, resulting in a toggle or over-center shift of the force vector and effecting rapid movement of the lever 9 in counter-clockwise direction. Upon de-clutching, lever 9 will rotate until it engages the stop screw 16. The center of gravity of lever 9 will likewise shift outwardly, and the effective lever arm of spring 14, with respect to the pivot axis of pin 11, will become smaller. The two effects — decrease of leverage arm of spring 14 with respect to lever 9, and shift of the center of gravity of lever 9 effectively compensate each other, so that the force applied to the coupling lever is approximately constant. The centrifugal force in excess of that balanced by the spring is absorbed by the inherent strength of the material of housing 1 of the drive element of the clutch.

If the drive speed of shaft 4 then decreases, a point will be reached in which the turning moment or torque due to the spring 14 will be greater than the moment due to the centrifugal force $F_C$. This causes the coupling lever 9 to snap inwardly, that is, in clockwise direction. At that point, the spring moment increases and the effective moment due to centrifugal force $F_C$ decreases. The excess moment causes engagement of the engagement surfaces 8, 17 and effects slipping connection of the driven element 7 and hence synchronization of rotation of the drive element and the driven element 7. Upon completely engaged clutch, the coefficient of friction $\mu$ between surfaces 8 and 17 will be $\mu = \mu_H$, that is, the holding or static coefficient of friction will be obtained, resulting in the force relationships as indicated by the vectors of FIG. 3.

Figure 4:
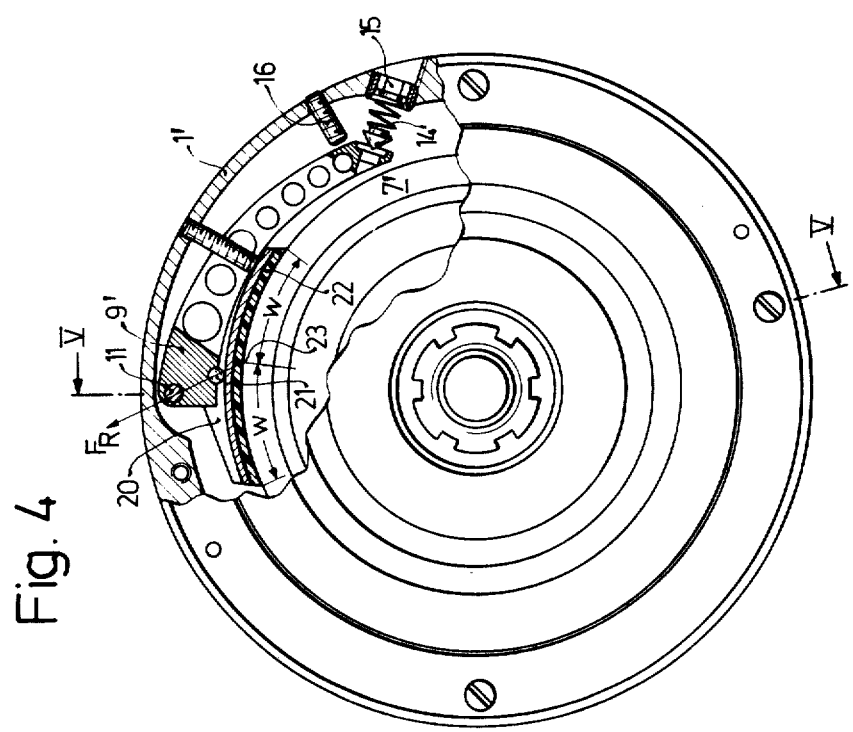
FIG. 4 is an axial end view of another embodiment of the clutch, with the housing partly broken away, and partly in section.

The embodiments illustrated in FIGS. 4 and 5 operate essentially similarly to those previously described, and similar parts have been given the same reference numerals with prime notation, and will not be described again.

The double-arm lever 9' does not directly engage the circumference 8' of the driven element of disk 7'. Rather, a clutch pad or shoe 20 is pivoted by a pin 21 to lever 9' at a position corresponding to the lever arm. The shoe 20 has a liner 22 secured thereto. The liner extends from a center 23 to two angular ranges W; the center of the liner 23 is so located that the resulting force $F_R$, when the clutch is engaged, passes through the center of the pin 21, to again effect self-binding of the clutch drive and driven elements. This results in force vector $F_R$ again passing through the pin 11 securing lever 9' to the housing 1' slightly in advance, with respect to the direction of rotation, of the clutch.

The clutch in accordance with the present invention has the unusual advantage that the load is unclutched without, effectively, any slippage of the clutch itself which might cause wear thereon; clutching engagement, however, upon decreasing speed of rotation is effectively damped. The clutch can be constructed in compact arrangement and has little wear, and permits simple adjustment of the speeds at which the clutch becomes engaged and disengaged by adjusting the tension of spring 14 by set screw 15, and the deflection distance of the lever by adjusting the set screw 16. The embodiment of FIG. 4 and 5 has the additional advantage of a greatly extended engagement surface and essentially uniform circumferential loading of the engagement surface with respect to the circumference of the dirven element.

Various changes and modifications may be made within the scope of the inventive concept.

The embodiments described have illustrated a clutch which is engaged when the speed of rotation is below a certain limit, and disengaged when the rotational speed increases above the limit. The engagement-disengagement modes, with respect to speed, can be reversed. The direction of the long arms of the levers 9, 9' with respect to the rotation of the clutch must be reversed; alternatively and referring to the embodiment of FIG. 1, the arrangement of parts, may be reversed left for right), so that the free end 12 of lever 9 will be at the left side of the pivot 11. The spring 14, screws 15 and 16 will then, likewise, be relocated at the left side of pivot 11 (FIG. 1).

We claim:

1. Centrifugal friction clutch having a drive rotary element (1) adapted for connection to a drive shaft (4) and a driven element (7), a lever shaped centrifugal element (9) subjected to centrifugal force upon rotation of the clutch, said lever shaped element (9) being a double-arm lever pivoted to rock about a pivot axis (11) essentially parallel to the drive shaft (4) and having one arm (10) facing the rotary surface of the driven element (7):

a spring (14) engaging the double-arm lever (9)

the pivot axis (11) being located a small distance (c) in advance — with respect to the direction of rotation of a location of a resultant force vector ($F_R$) resulting from a perpendicular force ($F_N$) exerted by said one arm (10) against the rotary surface (8) of the driven element (7) and the circumferential frictional force ($F_U$) between the engagement surface (17, 22) of said one arm and the rotary surface (8) of the drive element (7) when the clutch is engaged so that said one arm (10) of the lever (9) is in engagement with the driven element (7), resulting in self-binding, locking transmission of torque, deflection of said one arm (10) counter the force of the spring (14) upon rapid rotation of the clutch and due to increased centrifugal force ($F_C$) acting on said centrifugal double-arm lever (9) causing the resultant vector ($F_R$) to shift from behind the pivot axis (11) through the pivot axis in advance of the pivot axis and thus cause disengagement of the engagement surfaces of said arm and the circumference of the driven element upon transition from locking engagement to disengagement of the clutch;

a clutch shoe or pad (20, 22) forming the engagement surface for said one arm (10) of the lever (9);

and a floating connection (21) including a pin (21) between the shoe (20, 22) and said one arm (10) of the lever, the center line 23 of the shoe (20) parallel to the axis of rotation of the clutch being positioned between the floating pin (21) and the engagement point of the spring (14) on the lever (9).

2. Clutch according to claim 1, wherein the double-arm lever (9) is a sharply angled lever, said one arm forming a clutch engagement arm (10) and being provided with the engagement surface (17, 23) facing a circumferential surface (17) of the driven element (7) and located adjacent the pivot axis (11), said double-arm lever having a second arm extending essentially tangentially with respect to the circumference of the clutch.

3. Clutch according to claim 2, wherein the direction of extension of the other arm of the lever is in the direction of rotation (13) of the clutch.

4. Clutch according to claim 1, wherein the spring (14) is located on the drive element (1) of the clutch and engages the lever (9) at a position which places the engagement surface (17, 10, 22) of the said one arm of the lever (9) between the pivot axis (11) and the engagement point of the spring (14) on the lever (9).

5. Clutch according to claim 1, wherein said lever has another arm extending essentially circumferentially of the clutch; the spring (14) is located to engage the other arm of the lever (9), means (15) to adjust the engagement force of the spring; means (16) on the drive element adjustably limiting deflection of the lever (9) upon respective action of centrifugal and spring force; and wherein the engagement surface (17, 20, 22) of the said one arm of the lever with respect to the circumference (8) of the driven element is located substantially radially between the pivot axis (11) of the lever and the axis of rotation of the clutch to effect over-center shift of the resultant force vector ($F_R$) between leading and trailing positions with respect to a radial line connecting the center of the shaft and said pivot ais (11) upon changing between engaged and disengaged conditions of the clutch.

6. Centrifugal friction clutch having a drive rotary element (1) adapted for connection to a drive shaft (4) and a driven element (7) having a circumferential clutch engagement surface (8);

a lever-shaped centrifugal element (9) subjected to centrifugal force upon rotation of the clutch;

a spring (14) engaging the lever-shaped element and applying a force ($F_F$) counter the centrifugal force ($F_C$) on the lever-shaped element;

said lever-shaped element (9) being a double-arm lever and having a pivot axis (11) extending essentially parallel to the shaft, one arm (10) of the double-arm lever facing the rotary engagement surface (8) of the driven element (7); a clutch shoe or pad (20, 22) forming an engagement surface for said one arm (10) of the lever (9);

a floating connection (21) including a pin (21) between the shoe (20, 22) and said one arm (10) of the lever, the center line 23 of the shoe (20) parallel to the axis of rotation of the clutch being positioned between the floating pin (21) and the engagement point of the spring (14) on the lever (9);

and wherein the pivot axis (11) is located with respect to the resultant force vector ($F_R$) resulting from the perpendicular, radial force ($F_N$) exerted by said one arm (10) of the lever against the rotary engagement surface (8) of the driven element as a result of the respective preponderance of said centrifugal force ($F_C$) or the spring force ($F_N$) respectively and the circumferential frictional force between the engagement surfaces of said one arm (10) and the rotary surface (8) off the drive element (7) shifts between an advanced, on-center and trailing position with respect to the pivot axis (11) of the lever, to effect, selectively, over-center, self-locking, self-binding engagement of said engagement surfaces or released positioning of said engagement surfaces and over-center toggle operation of said clutch in dependence on the relative preponderance of the turning moment of the lever about said pivot axis (11) upon change of relative strength of the force ($F_F$) exerted by said spring (14) and the centrifugal force ($F_C$).

* * * * *